(12) United States Patent
Suda

(10) Patent No.: US 6,566,641 B1
(45) Date of Patent: May 20, 2003

(54) SCANNING OPTICAL SYSTEM HAVING AUTOMATIC POWER CONTROL WITH SAW-TOOTH WAVE GENERATING CIRCUIT

(75) Inventor: Tadaaki Suda, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 8 days.

(21) Appl. No.: 09/716,293

(22) Filed: Nov. 21, 2000

(30) Foreign Application Priority Data

Nov. 22, 1999 (JP) ............................................ 11-331152

(51) Int. Cl.$^7$ ................................................. G01J 1/32
(52) U.S. Cl. ...................................... 250/205; 347/253
(58) Field of Search ..................... 250/214 R, 214 A, 250/214 L, 205; 327/514; 347/253, 251, 247, 240, 131; 358/298

(56) References Cited

U.S. PATENT DOCUMENTS

| | | | |
|---|---|---|---|
| 4,656,533 A | * | 4/1987 | Sakai et al. .................... 360/46 |
| 5,533,003 A | * | 7/1996 | Kobayashi ................ 369/275.4 |
| 5,644,261 A | * | 7/1997 | Frisch et al. ................. 327/276 |
| 5,973,719 A | * | 10/1999 | Araki et al. ................. 347/131 |

* cited by examiner

*Primary Examiner*—Stephone B. Allen
*Assistant Examiner*—Bradford Hill
(74) *Attorney, Agent, or Firm*—Greenblum & Bernstein, P.L.C.

(57) ABSTRACT

In a scanning optical device having an APC (automatic power control) circuit for controlling an output power of a laser diode, a reference value is determined by sampling saw-tooth wave which varies time elapses. A triggering system is provided to output a trigger signal, and the saw-tooth wave is sampled and held in response to the trigger signal. Based on the sampled and held value, i.e., the reference value and a value corresponding to the output power of the laser diode, an APC operation is performed.

14 Claims, 8 Drawing Sheets

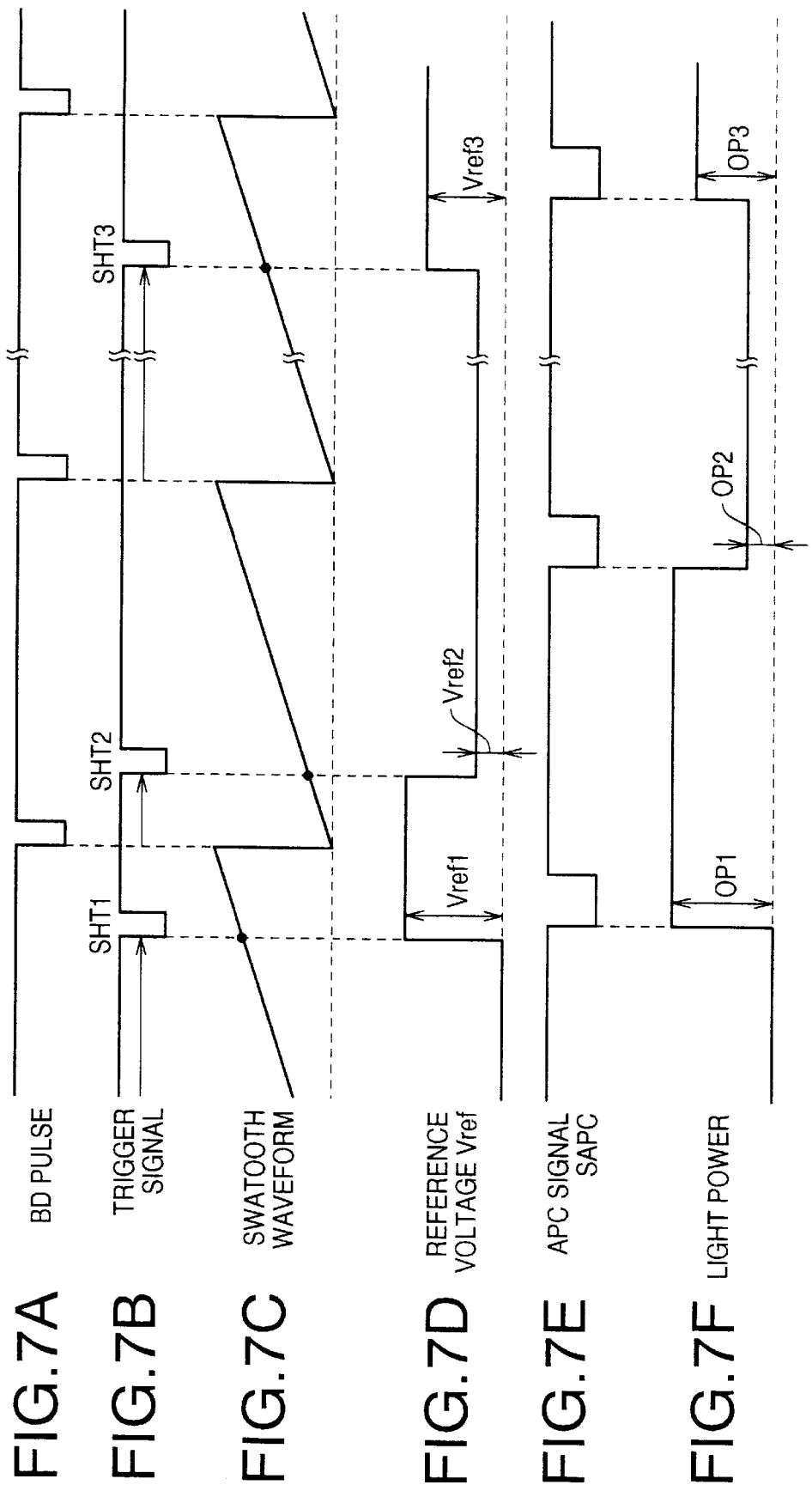

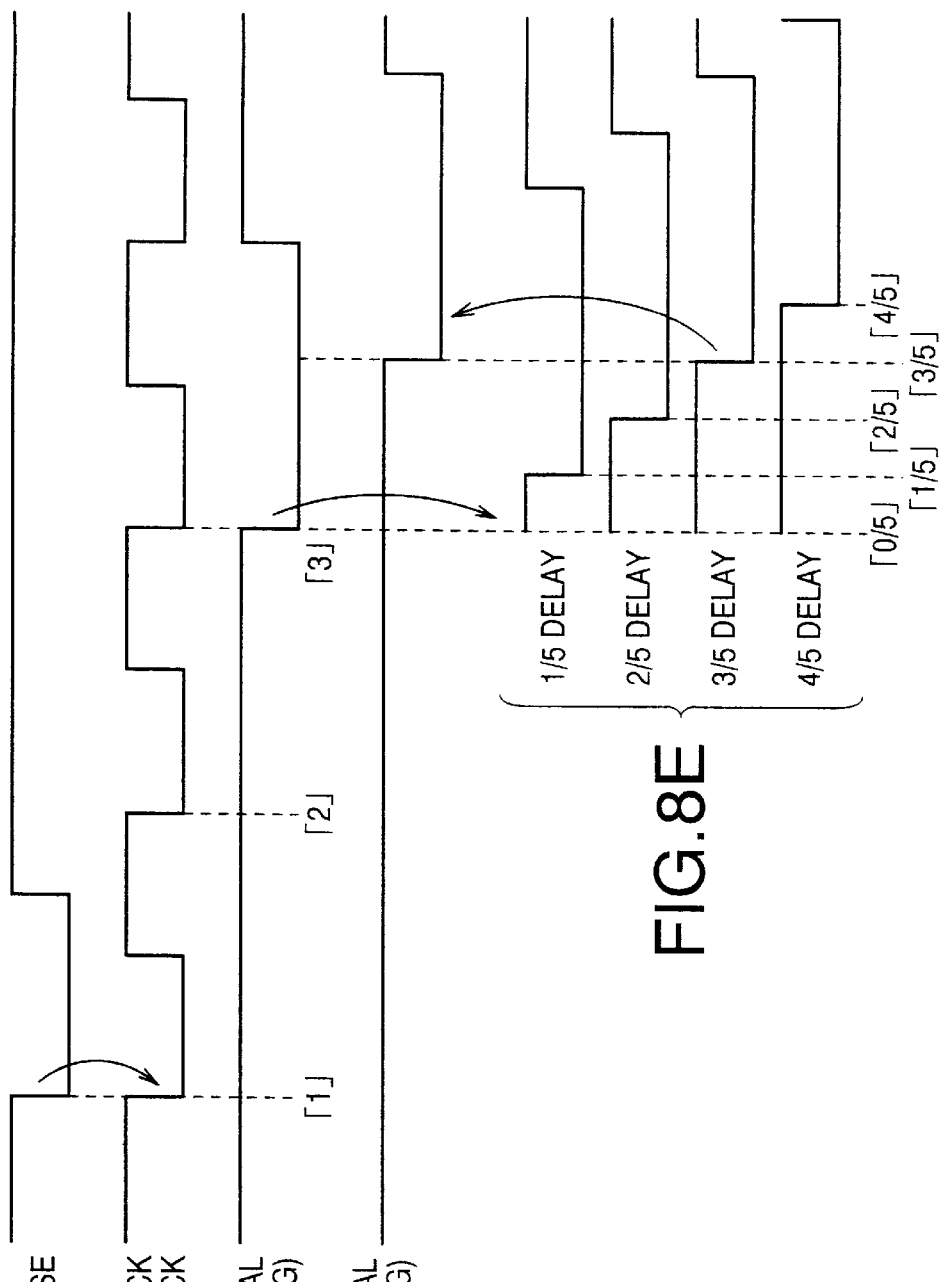

SCANNING OPTICAL SYSTEM HAVING AUTOMATIC POWER CONTROL WITH SAW-TOOTH WAVE GENERATING CIRCUIT

BACKGROUND OF THE INVENTION

The present invention relates to a scanning optical system employed, for example, in a laser beam printer. More specifically, the present invention relates to a scanning optical system having an automatic power control (APC) circuit for controlling the output power of a laser diode provided in the scanning optical system.

It sometimes becomes necessary to change an output power of a laser diode in a laser beam printer. For example, in order to change an image forming speed (i.e., a scanning speed) of the laser beam, it also becomes necessary to change the output power of laser beam on a surface to be scanned (e.g., the surface of a photoconductive drum).

In another case, in a color laser beam printer employing a plurality of scanning optical systems and a plurality of photoconductive drums, since all the photoconductive drums may not have the same sensitivity to light, it may become necessary to adjust the output power of laser diodes corresponding to the photoconductive drums, respectively.

Conventionally, for controlling the output power of the laser diode(s), a scanning optical system having an automatic power control (APC) function has been widely used. An example of an output power switching apparatus which switches the output power of the laser diode by performing the APC function is disclosed in Japanese Provisional Patent Publication HEI 6-164037.

The light power switching apparatus described in the above publication is schematically shown in FIG. 1. In the power switching apparatus shown in FIG. 1 includes a laser diode LD, which emits a laser beam, a driving current generating circuit 1 which receives an APC signal and generates a driving current, which causes the laser diode LD to emit a laser beam, a photodiode PD, which receives the laser beam (a back beam) and generates an electrical current corresponding to the intensity of the received laser beam. The electrical current generated by the photodiode PD flows through a resistor connected in series with the photodiode PD, and is converted into a detection voltage Vs. The power switching apparatus further includes a comparator 3 which compares the detection voltage Vs corresponding to the electrical current generated by the photodiode PD with a reference voltage Vref and then outputs a result of the comparison to the driving current generating circuit 1, and a variable-type reference voltage generating circuit 4 which changes the reference voltage Vref based on data externally inputted. Further, the light power switching apparatus includes a switching circuit 2 which ON/OFF controls the driving current supplied from the driving current generating circuit 1 to the laser diode LD in accordance with an image signal.

The reference voltage generating circuit 4 generates the reference voltage Vref responsive to the externally input data.

The data externally input to the reference voltage generating circuit 4 is well correlated with a required intensity of the laser beam on the surface of the photoconductive drum. The externally input data represents the required intensity of the laser beam, and therefore, the reference voltage generating circuit 4 generates the reference voltage Vref which corresponds to the required intensity of the laser beam on the surface of the photoconductive drum.

The driving current generating circuit 1 varies the driving current supplied to the laser diode LD in accordance with the comparison result of the comparator 3 so that the detection voltage Vs coincides with the reference voltage Vref. As a result, the intensity of the laser beam on the photoconductive drum coincides with the required intensity.

In general, the photoconductive drum, the laser diode LD, the photodiode PD and a polygonal mirror (not shown in FIG. 1), and a circuit including the comparator 3, the driving current generating circuit 1 and the switching circuit 2 are arranged integrally in a scanning optical unit, which is placed in a housing of the laser beam printer. The reference voltage generating circuit 4 is arranged in the housing as a control unit, separately from the scanning optical unit.

One of the reasons for adopting such a configuration is to facilitate maintenance of the laser beam printer. The scanning optical unit relatively easily degrades with aging, while, the control unit hardly deteriorates with aging. Therefore, in most cases, for the purpose of the maintenance, only the scanning optical unit is replaced.

However, if the scanning optical unit and the control unit are configured as separated units, it becomes necessary to use a cable in order to supply the reference voltage Vref from the reference voltage generating circuit 4 to the comparator 3. The scanning optical unit and the control unit are often spaced apart from each other. In such a case, the cable, which transmits the reference voltage Vref, should be made relatively long. In this case, since the reference voltage Vref is transmitted as an analog signal, a noise may be superimposed on the reference voltage Vref within the cable. Such a noise causes a small variation of the reference voltage Vref, which results in a variation in driving current that is generated by the driving current generating circuit 1. As a result, the output power of the laser diode LD may change significantly. In particular, if the reference voltage is lifted to a relatively high voltage due to the noise, then a significantly strong current may be supplied to the laser diode LD, and may damage the laser diode LD.

In order to prevent the effect of the noise on the reference voltage Vref, the reference voltage generating circuit 4 may preferably be arranged in the scanning optical unit. Then, since a path, across which the reference voltage Vref is transmitted to the comparator 3, is located on the circuit board in the scanning optical unit, the noise on the reference voltage Vref will be suppressed sufficiently.

However, since the reference voltage generating circuit 4 is generally includes a D/A converter which converts digital data corresponding to the reference voltage Vref to an analog signal, the reference voltage generating circuit 4 is relatively large and expensive.

In view of downsizing of a laser beam printer, it is preferable to downsize the scanning optical unit. In particular, a color laser beam printer, which has a plurality of photoconductive drums and a plurality of scanning optical units, requires that the size of the scanning optical units is reduced. However, if the reference voltage generating circuit 4 is included in the scanning optical unit, then the scanning optical unit can not be downsized.

In addition, if the reference voltage generating circuit 4 is provided in the scanning optical unit, the scanning optical unit becomes expensive. Since the scanning optical unit is to be replaced when maintenance is carried out, the maintenance cost also becomes expensive.

SUMMARY OF THE INVENTION

It is therefore an object of the invention to provide an improved scanning optical device having an APC (automatic power control) circuit for controlling an output power of a laser diode, with which increase of manufacturing/maintenance costs of the scanning optical unit is avoidable, without being upsized.

For the object, according to the present invention, there is provided a scanning optical device having an automatic power control circuit for controlling an output power of a laser diode. The automatic power control circuit is provided with a detecting system that detects an output power of the laser diode and outputs a detection value corresponding to the detected output power of the laser diode, and a reference value setting system that outputs a reference value, the reference value setting system including a first circuit that outputs a first signal having a predetermined waveform, the waveform varying as time elapses, and a sample-and-hold circuit that samples and holds the first signal. Further, the scanning optical device is provided with a triggering system that transmits a trigger signal, the sample-and-hold circuit sampling and holding the first signal in response to the trigger signal, the sampled and held value of the first signal being output from the reference value setting system as the reference value. The automatic power control circuit is further provided with a comparing system that compares the detection value with the reference value, and outputs a signal representing a difference between the detection value and the reference value, and a driving current controlling system that controls a driving current flowing through the laser diode in accordance with the signal output by the comparing system to vary the output power of the laser diode so that the detection value coincides with the reference value.

With this configuration, the automatic power control circuit is capable of controlling an output power of a laser diode accurately, with suppressing the manufacturing/maintenance costs of the scanning optical unit. Further, since the circuits are relatively simple, the scanning optical unit can be downsized.

Optionally, the automatic power control circuit may further include an APC controlling system that transmits an APC signal to the comparing system at a predetermined timing, the comparing system comparing the detection value with the reference value upon reception of the APC signal.

Further optionally, the triggering system may configured to determine a timing at which the trigger signal is output in accordance with at least one of a scanning speed, a sensitivity of a surface to be scanned and a resolution of an image to be formed.

In particular, the first circuit may include a saw-tooth wave generating circuit, a waveform of a signal output by the saw-tooth wave generating circuit linearly hanging as time elapses.

In a particular case, an amplitude of the signal output by the saw-tooth wave generating circuit may increase as time elapses.

Still optionally, the laser beam emitted by the laser diode is periodically scanned at a predetermined cycle, and the saw-tooth wave generating circuit generates the signal having a saw-tooth shaped waveform synchronously with the periodical scanning of the laser beam.

Further optionally, the amplitude of the signal output by the saw-tooth wave generating circuit may increase from its minimum value at every scanning of the laser beam.

Preferably, the amplitude of the signal output by the saw-tooth wave generating circuit may vary between the minimum value and a predetermined maximum value.

Optionally, the scanning optical device includes a scanning optical unit that deflects the laser beam emitted by the laser diode to scan on a surface to be scanned, and the scanning optical unit is integrally constructed with the automatic power control circuit. In this case, the triggering system can be constructed separate from the scanning optical unit, and the triggering system and the scanning optical unit are connected with at least a cable for transmitting the triggering signal.

Further optionally, the laser beam emitted by the laser diode periodically scans at a predetermined cycle, the saw-tooth wave generating circuit generating the signal having the saw-tooth shaped waveform synchronously with the periodical scanning of the laser beam.

Still optionally, the scanning optical unit may include a synchronizing signal generating system that generates a synchronizing signal which is output synchronously with every scanning of the laser beam, the saw-tooth wave generating circuit being reset in response to the synchronizing signal, the triggering system determines the timing at which the triggering signal is output in accordance with image data of an image to be formed.

In this case, the triggering system may include a clock generator that generates a clock signal including clock pulses output at a predetermined frequency, a counter that counts the number of the clock pulses included in the clock signal, and a number setting system that sets a number to be counted by the counter, the triggering signal being output when the counter has counted the number set by the number setting system.

Optionally, the number setting system determines the number set to the counter based on the image data.

Further optionally, the triggering system may include a clock generator that generates a clock signal including clock pulses output at a predetermined frequency, a counter that counts the number of the clock pulses included in the clock signal, a number setting system that sets a number to be counted by the counter, the counter outputting a count-up signal when the counted number of the clock pulses reaches the number to be counted, and a delay unit that delays the count-up signal by one of a plurality of durations of time, each of the plurality of durations of time being shorter than a period of the clock pulses, the delayed count-up signal being output as the triggering signal.

According to another aspect of the invention, there is provided a scanning optical device having an automatic power control circuit for controlling an output power of a laser diode, provided with a detection system that detects an output power of said laser diode and outputs a value corresponding to the output power of said laser diode, a saw-tooth wave generating system that outputs a saw-tooth wave which varies as time elapses, a triggering system that outputs a trigger signal, and a sample-and-hold system that samples and holds the saw-tooth wave in response to the trigger signal. An automatic power control operation is performed based on said sampled and held value and the value corresponding to the output power of the laser diode.

BRIEF DESCRIPTION OF THE ACCOMPANYING DRAWINGS

FIG. 1 is a block diagram of a conventional automatic power control (APC) circuit;

FIG. 2 a conceptual diagram of a color laser beam printer to which the present invention is applied;

FIGS. 7A–7F show a timing chart showing an automatic power control operation according to an embodiment of the invention; and FIGS. 8A–8E show a timing chart showing an operation of the counter and the delay circuit according to an embodiment of the invention.

DETAILED DESCRIPTION OF THE EMBODIMENT

Hereinafter, the embodiment according to the invention will be described in detail with reference to the accompanying drawings.

Figure 1:
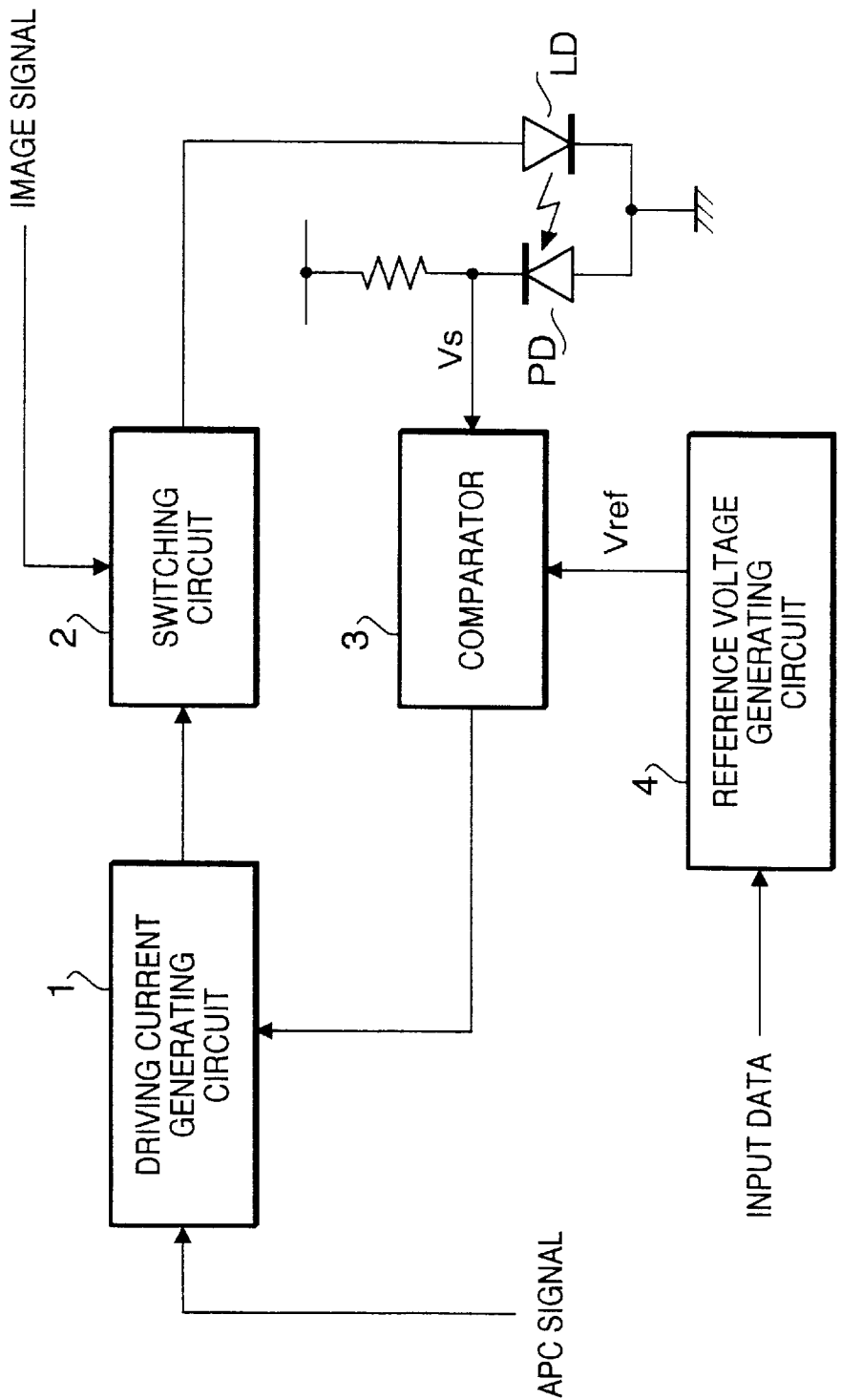
Figure 2:
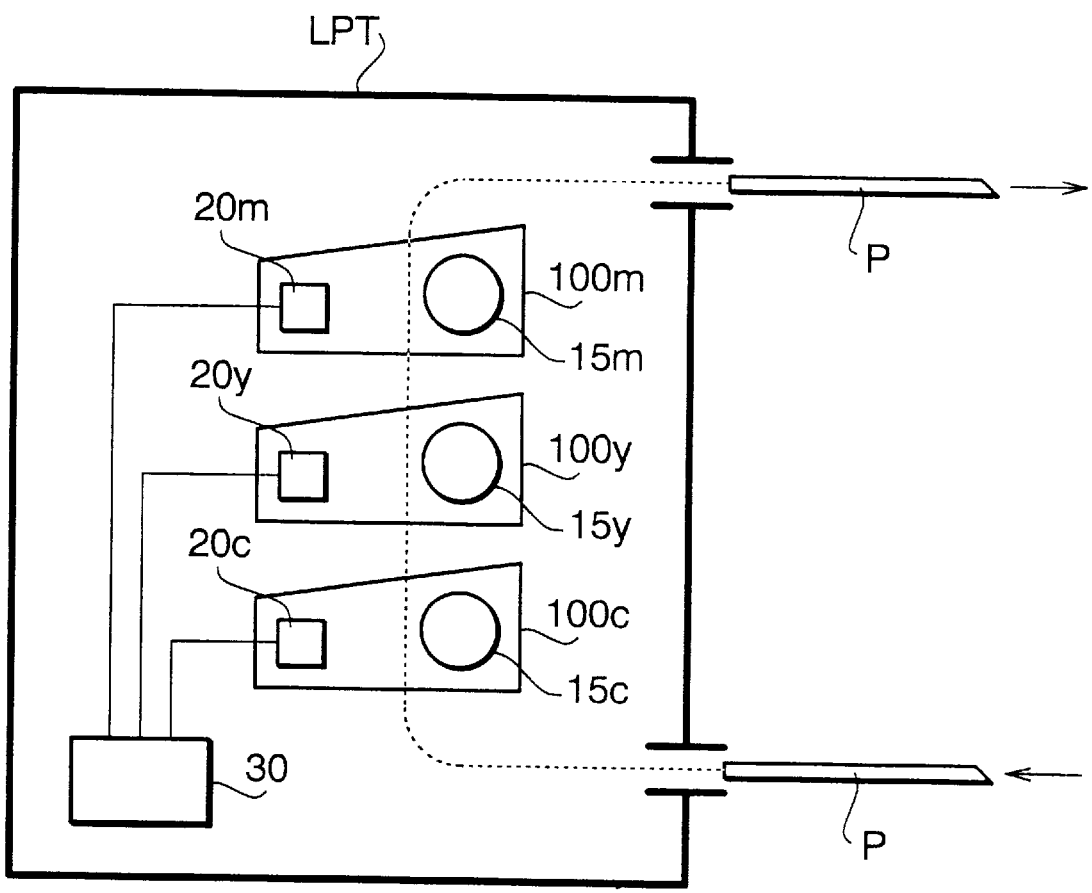

FIG. 2 is a conceptual diagram of a color laser beam printer LPT to which a scanning optical unit according to an embodiment of the present invention is be applied. In a housing (not numbered) of the printer LPT shown in FIG. 2, three scanning optical units 100m, 10y, and 100c are provided. In the three scanning optical units 100m, 100y, and 100c, latent images for magenta, yellow, and cyan components of a color image to be printed are formed on photoconductive drums 15m, 15y and 15c, respectively. The images of the color components are developed by applying color toners at the scanning optical unit 100m, 10y and 100c, are then transferred, in an overlaid fashion, on a sheet. The printer LPT is further provided with a control unit 30, which controls the operation of the three scanning optical units 100m, 10y, and 10c. As shown in FIG. 2, three automatic power control (APC) circuit 20m, 20y, and 20c are incorporated in the scanning optical units 100m, 10y, and 100c, respectively. The APC circuit 20m, 20y, and 20c controls an output power of laser diodes provided in the scanning optical units 100m, 100y, and 100c, respectively, as follows.

Figure 3:
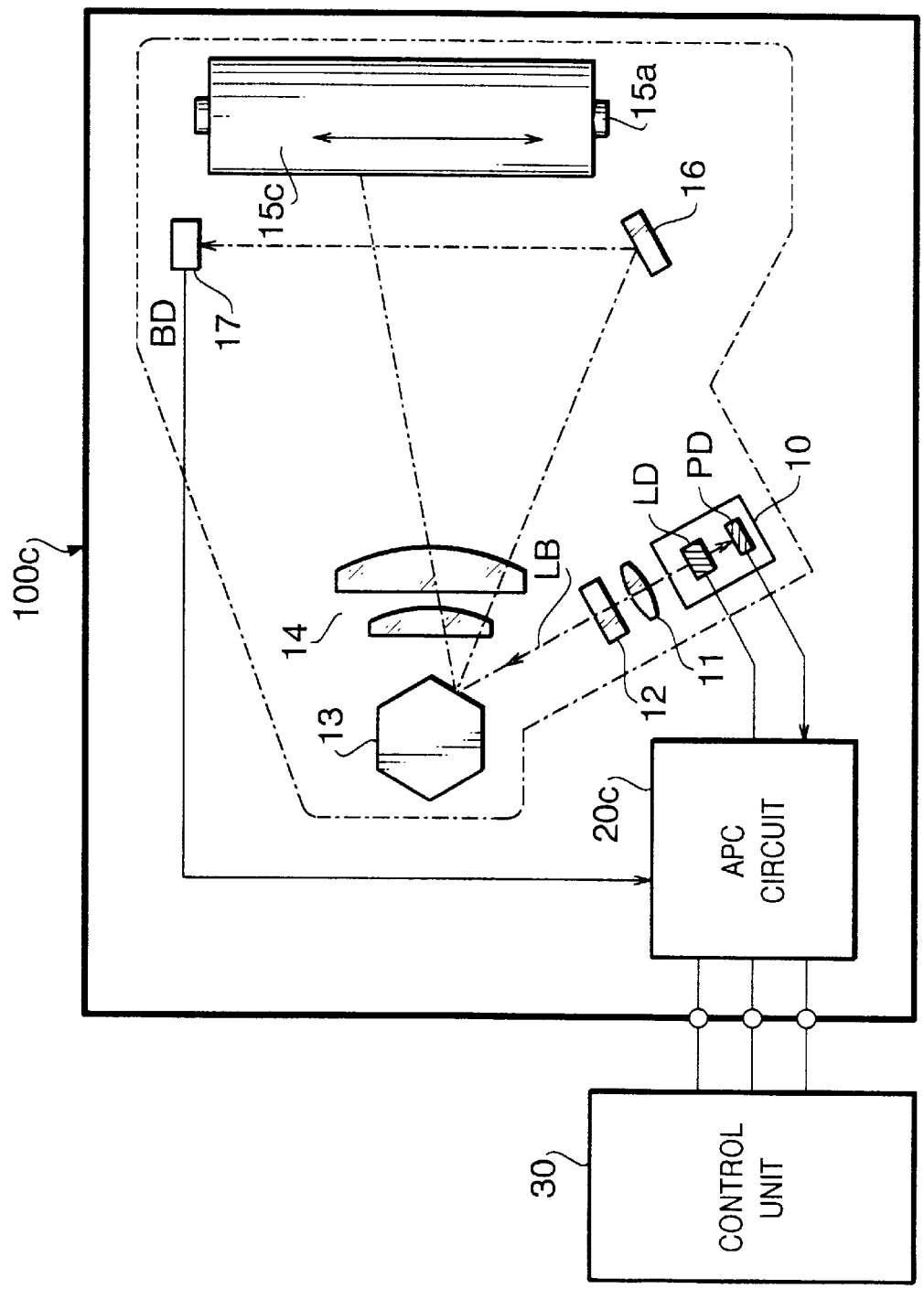
FIG. 3 shows a block diagram of a scanning optical unit according to an embodiment of the invention.

FIG. 3 is a block diagram of one of the scanning optical units 100m, 10y, and 10c. It should be noted that all the scanning optical units 100m, 10y, and 100c are structurally the same. Accordingly, only the scanning optical unit 10c will be described.

As shown in FIG. 3, a scanning optical unit 100c is provided with a laser module 10 which is provided with a laser diode LD and a photodiode PD for monitoring a laser beam emitted from the laser diode LD as is employed in the conventional scanning optical system.

The laser beam emitted from the laser diode LD is collimated by a collimating lens 11 and passes through a cylindrical lens 12. The collimated laser beam LB, which is emerged from the cylindrical lens 12, impinges on a reflecting surface of a polygonal mirror 13, which is rotating at a high speed.

The laser beam LB is deflected by the polygonal mirror 13 to scan, in a main scanning direction, within a predetermined angular range. The laser beam deflected by the polygonal mirror 13 passes through an fθ lens 14 and then converges on the surface of the photoconductive drum 15c.

The photoconductive drum 15c rotates around an axis of rotation 15a. Since the laser beam LB scans on the circumferential surface of the photoconductive drum 15c in a direction parallel with the rotation axis 15a, and the photoconductive drum 15c rotates, i.e., the surface of the photoconductive drum 15c moves with respect to the laser beam LB in an auxiliary scanning direction, a two-dimensional image (latent image) is formed on the circumferential surface of the photoconductive drum 15c.

A mirror 16 is provided beside one end of the photoconductive drum 15c within a range where the laser beam LB scans. The mirror 16 reflects the laser beam LB toward a photo detector 17, which is arranged beside the other end of the photoconductive drum 15c. The photo detector 17 produces a synchronizing pulse BD which synchronizes to every main scanning. The scanning optical unit 10c is further provided with the automatic power control (APC) circuit 20. The output signal of the photo detector 17 is input to the APC circuit 20c.

Figure 4:
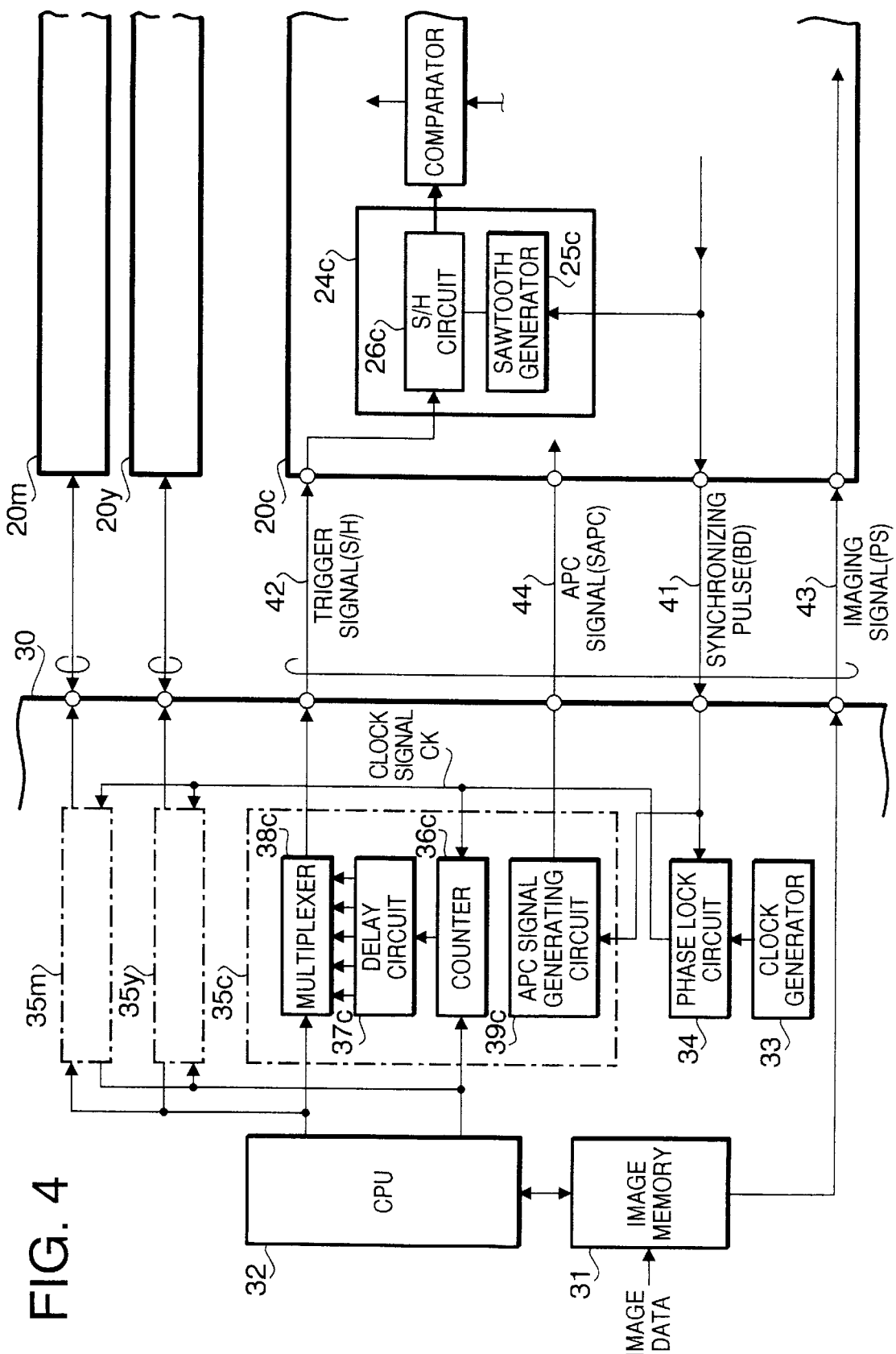
FIG. 4 shows a block diagram showing a part of an APC circuit and a part of a scanning optical unit according to the embodiment of the invention.

FIG. 4 shows a block diagram of the APC circuit 20c and the control unit 30. The APC circuit 20m, 20y, and 20c are incorporated in the scanning optical unit 100m, 10y, and 100c, respectively. It should be noted that all the APC circuit 20m, 20y, and 20c are structurally the same, and therefore what is described in connection with the APC circuit 20c also applies to the other APC circuits 20m and 20y.

Figure 5:
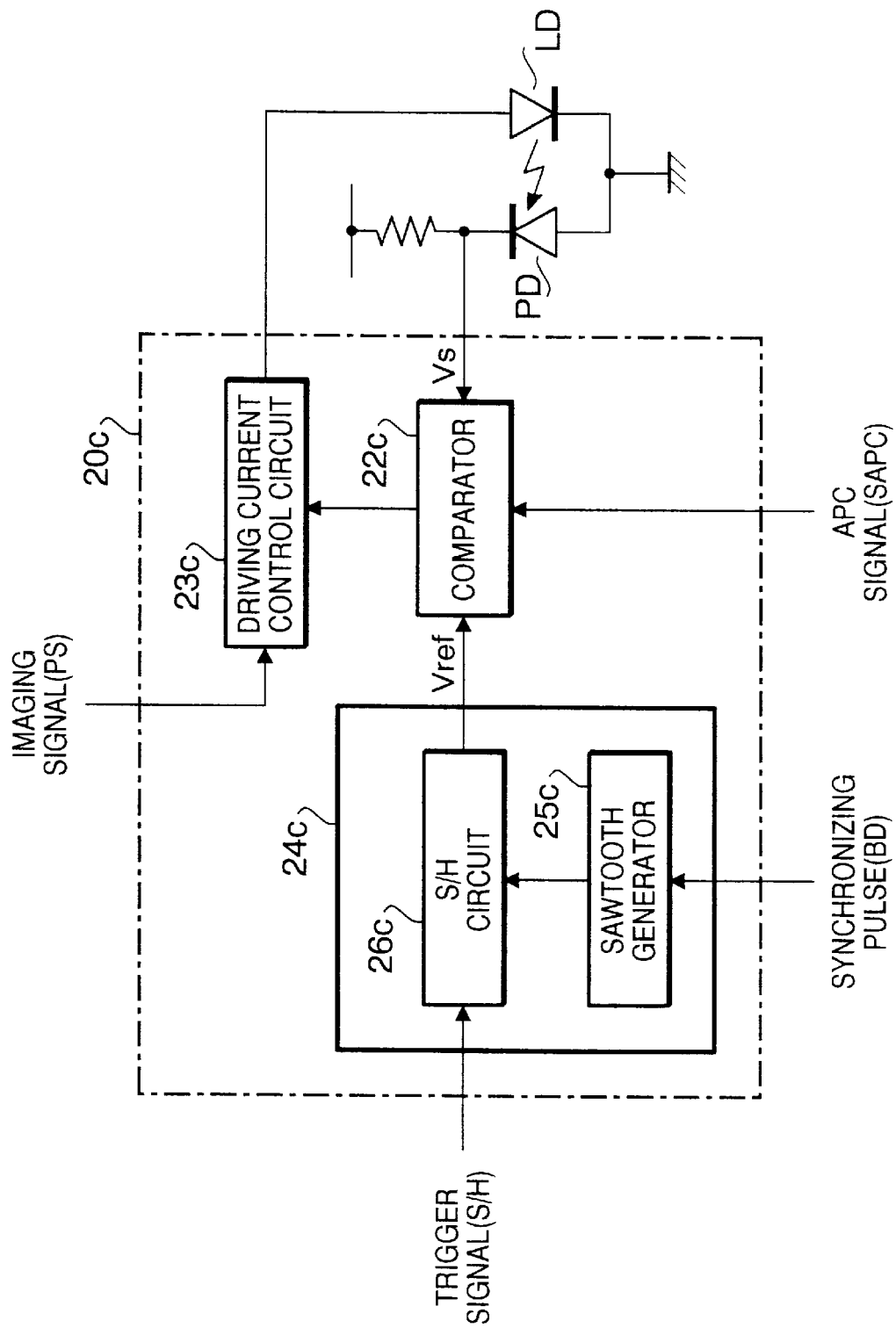
FIG. 5 is a block diagram of the APC circuit according to an embodiment of the invention.

FIG. 5 shows a block diagram of the APC circuit 20c in detail. As shown in FIG. 5, the APC circuit 20c is provided with:

a reference voltage generating circuit 24c that generates a reference voltage Vref;

a comparator 22c that generates a signal representing a result of a comparison of the reference voltage Vref with an output signal Vs of the photo diode PD; and a driving current control circuit 23c that outputs a driving current which is supplied to the laser diode LD in accordance with the signal transmitted from the comparator 22c (i.e., in accordance with the comparison result). In addition, the driving current output by the driving current control circuit 23c is controlled in accordance with an imaging signal PS.

The reference voltage generating circuit 24c includes a sample-and-hold (S/H) circuit 26c and a saw-tooth wave generator 25c. The saw-tooth wave generator 25c generates a pulse signal having a saw-tooth shaped waveform synchronously with a synchronizing pulse BD transmitted from the photo detector 17. For example, the saw-tooth wave generator includes a well-known triangular wave generating circuit using an operational amplifier. The saw-tooth wave generator repeatedly outputs the saw-tooth pulse gradually increasing from a minimum voltage to a maximum voltage at a predetermined period.

The S/H circuit 26c samples a voltage of the saw-tooth pulse at a certain timing within the period in which the saw-tooth wave pulse changes from the minimum voltage to the maximum voltage, and holds the sampled voltage. The voltage sampled and held by the S/H circuit 26c is output to the comparator 22c as the reference voltage Vref.

Next, a configuration of the control unit 30 will be described in detail with reference to FIG. 4. As shown in FIG. 4, the control unit 30 is connected with the APC circuit 20c by four signal cables 41–44. The control unit 30 is provided with an image memory 31, which stores image data to be printed. The image data is input from an external device through an not shown interface.

A CPU 32 reads the image data from the image memory 31, and then outputs the image data of each color component to the corresponding APC circuit. The image data corresponding to the cyan component is transmitted to the APC circuit 20c as the imaging signal PS. The CPU 32 also outputs imaging signals, which correspond to magenta and yellow components, to the APC circuits 20m and 20y, respectively.

The control unit 30 is further provided with a clock generator 33, which generates clock signals having predetermined frequencies, and a phase lock circuit 34 which makes the clock signal to be in phase with the synchronizing pulse BD transmitted from the photo detector 17 through the signal cable 41. The phase-locked clock signal is output to timing signal generating circuits 35c, 35m and 35y.

The timing signal generating circuit 35c is provided with a counter 36c, which counts the number of pulses of the phase-locked clock signal (hereinafter referred to as the clock signal CK). The counter 36c generates a count-up signal when the counted number reaches a predetermined number. Further, the timing signal generating circuit 35c is provided with a delay circuit 37c, which delays the clock signal CK output by the phase lock circuit 34 by a fixed time duration that is shorter than a period of the clock signal CK (hereinafter, the period will be referred to as τ), and a multiplexer 38c.

Figure 6:
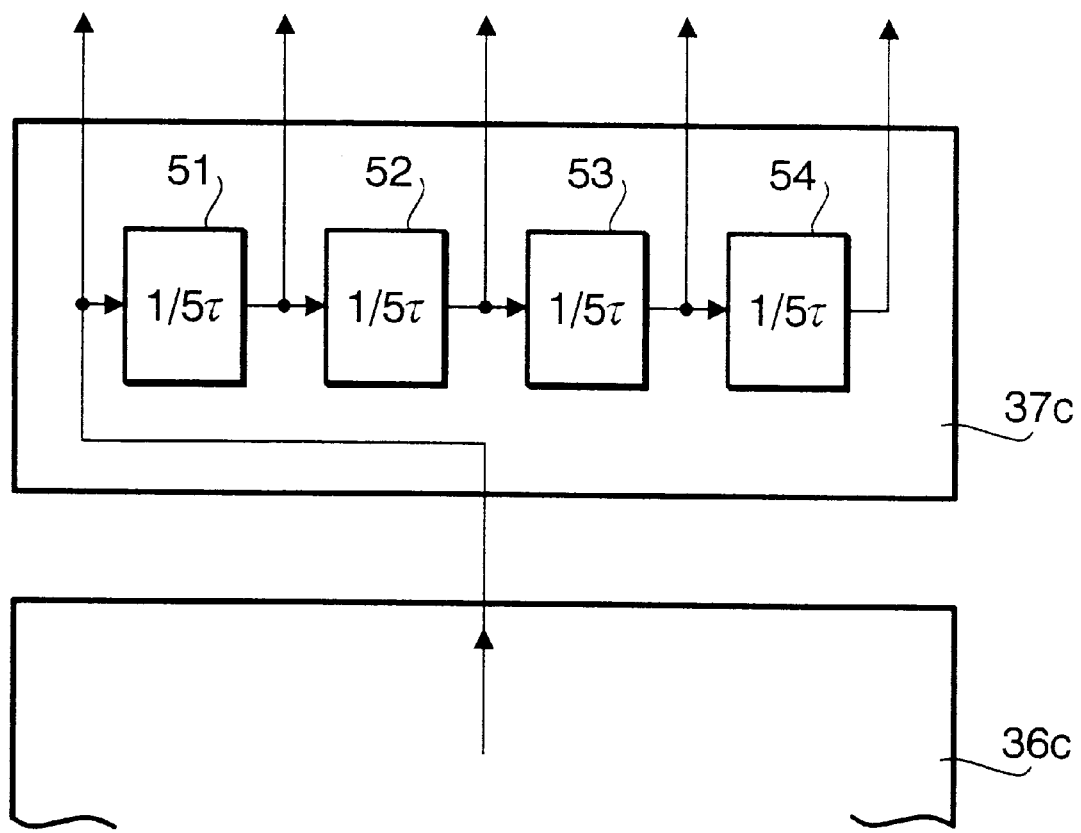
FIG. 6 is a block diagram of a delay circuit according to an embodiment of the invention.

Specifically, as shown in FIG. 6, the delay circuit 37c is provided with four delay elements 51–54 connected in series. Output signal of each of the delay elements 51–54 are transmitted to the multiplexer 38c. In this embodiment, the delay elements 51–54 have the same delay time (1/5)τ, and therefore, the output signals of the delay circuit 37c have delay factors 0/5, 1/5, 2/5, 3/5 and 4/5, respectively. One of these output signals is selected by the multiplexer 38c, and is transmitted, as a sample-and-hold (S/H) signal (which will also be referred to as a trigger signal), to the APC circuit 20c. It should be noted that settings of the counter 36c and a setting of a selection of the multiplexer 38c are carried out by the CPU 32 according to the resolution of the image to be printed (e.g., high resolution for an image, and low resolution for characters).

Further, the timing signal generating circuit 35c is provided with an APC signal generating circuit 39c which receives the synchronizing pulse (BD) and, in response to the reception of the synchronizing pulse, generates an APC signal SAPC (of which timing chart is shown in FIG. 7). The timing generating circuit 35c transmits the APC signal SAPC to the APC circuit 20c through the signal cable 44. It should be noted that all the timing signal generating circuits 35c, 35m, and 35y are structurally the same, and therefore what is described in connection with the timing signal generating circuit 35c also applies to the other timing signal generating circuits 35m and 35y, which are connected to the APC circuit 20m and 20y, respectively.

Next, an operation of automatic control of the output power of the laser diode LD will be described in detail with reference to FIG. 4 and FIG. 5.

As described above, the driving current control circuit 23c controls the current to be supplied to the laser diode LD in accordance with the image signal PS, that is, a density of each dot (pixel) of the image to be printed. Therefore, the latent images corresponding to the image to be printed are formed on the photoconductive drums 15c, 15m and 15y, and the latent images are developed as cyan, magenta and yellow color toners are applied thereonto, respectively.

The photodiode PD receives the laser beam emitted by the laser diode LD, and then generates a current corresponding to the received light, i.e., corresponding to the output power of the laser diode LD. Then, the APC circuit 20c receives the voltage Vs which is a voltage corresponding to the output current of the photo diode PD.

The comparator 22c compares the voltage Vs with the reference voltage Vref when the comparator 22c receives the APC signal (SAPC). If the voltage Vs is higher than the reference voltage Vref, then the driving current control circuit 23c decreases the driving current. If the voltage Vs is lower than the reference voltage Vref, then the driving current control circuit 23c increases the driving current. Therefore, it becomes possible to control a current to correspond to the reference voltage Vref.

As described above, the reference voltage Vref can be changed, by the CPU 32, according to an individual difference of sensitivity of the photoconductive drum and/or the type of the image to be printed. Thus, automatic control of the output power of the laser diode LD can be achieved. If a speed of the main scanning is lowered to form an image at high resolution, the output power of the laser diode LD is lowered, by changing the reference voltage Vref to be lower than a value when an image is to be printed at low resolution (i.e., at a high speed), such as a text image.

Next, an operation of the reference voltage generating circuit 24c and the control unit 30 will be described in detail with reference to FIGS. 7A–7F. FIGS. 7A–7F show a timing chart of the reference voltage generating circuit 24c and the control unit 30. The photo detector 17 detects the main scanning and outputs the synchronizing signal (i.e., BD pulse), to the saw-tooth wave generator 25c.

The saw-tooth wave generator 25c is reset to output the minimum voltage at a timing of a falling edge of the synchronizing pulse BD. Then, the amplitude of the saw-tooth pulse gradually increases until the next synchronizing pulse (i.e., BD pulse) is received. It should be noted that, as mentioned before, the output signal of the saw-tooth wave generator 25c has its maximum value. Therefore, even if the saw-tooth wave generator 25c is not reset, the amplitude of the saw-tooth wave does not exceed the maximum value.

The counter 36c, which counts the number of pulses of the clock signal CK transmitted from the phase lock circuit 34, is reset when the synchronizing pulse BD is input. The APC signal generating circuit 39c generates the APC signal SAPC a predetermined period after the falling edge of the synchronizing pulse BD.

When image data is transmitted from the external device, through the interface, to the image memory 31, the CPU 32 determines whether the image is to be printed at a high resolution or low resolution, and then determines a target value of the reference voltage Vref. Optionally, the CPU 32 may determine the target value of the reference voltage Vref according to printing mode settings including, for example, a print speed, input to the CPU32 from external device through the interface. Next, the CPU 32 determines a timing at which the voltage of the saw-tooth waveform coincides with the target (reference) voltage Vref. The CPU 32 determines this timing, for example, by referring to a predetermined table. Preferably, this predetermined table is stored in a memory embedded in the CPU 32.

Further, the CPU 32 determines a number to be counted by the counter 36c from the reset of the counter 36c (i.e., the falling edge of the BD pulse) till the timing at which the number of the pulses reaches the number determined above. Then, the count-up signal is transmitted from the counter 36c to the S/H circuit 26c as the S/H signal. The S/H circuit 26c in the reference voltage generating circuit 24c samples and holds the saw-tooth waveform when it receives the trigger (S/H) signal (e.g., at the falling edge of the trigger signal), and transmits the held voltage to the comparator 22c as the reference voltage Vref.

If a period of the clock signal CK is sufficiently shorter than a period of the saw-tooth waveform, the number to be counted by the counter 36c may be an integer. However, if a period of the clock signal CK in not sufficiently shorter than a period of the saw-tooth waveform, it becomes necessary to add a fraction to an integer. That is, the number to be counted includes the integer part and the fraction part.

The integer part is counted by the counter 36c. The counter 36c outputs the count-up signal when the counter 36c reaches the integer part of the number to be counted. The fractional part is dealt with by the multiplexer 38c. In the multiplexer 38c, one of the output signals from the delay circuit 37c, which corresponds to the fractional part, is selected. Therefore, the trigger signal is generated at a timing corresponding to the integer part plus the fraction part.

As shown in FIGS. 8A–8E, if the number to be counted is "3+3/5", then the CPU 34 sets "3" to the counter 36c, thereby the counter 36c outputs the count-up signal when the counter 36c reaches "3". from the reset timing (i.e., the falling edge of the BD signal). Strictly speaking, as shown in FIGS. 8B and 8C, the counter 36c counts trailing edges of the clock signal CK. The delay circuit 37c outputs five signals, which are the signals delaying the carry signal by $(0/5)\tau$, $(1/5)\tau$, $(3/5)\tau$, $(4/5)\tau$ of the clock signal CK, respectively, to the multiplexer 38c. The CPU 34 sets the multiplexer 38c to select, for example, the $(3/5)\tau$ delayed carry signal. Then, the trigger signal having the delay time "3+3/5" (see FIG. 8D) is output from the multiplexer 38c. Therefore, a delay time of the trigger signal can be adjusted at high accuracy, which is shorter than the period of the clock signal CK.

Since the S/H circuit 24c samples and holds the saw-tooth wave when it receives the trigger signal, it can sample and hold any voltage between the minimum and the maximum voltages by changing the timing of the trigger signal, thereby the reference voltage Vref being varied arbitrarily.

As shown in FIGS. 7B and 7C, the longer a delay time of the trigger signal is, from the BD signal, the higher a voltage of Vref is. For example, a delay of timing SHT1 is relatively late, and therefore, the reference voltage Vref1 is relatively high. The APC operation is performed according to the relatively high reference voltage Vref1, thereby the output power of the laser diode LD is adjusted to be a relatively high level, OP1.

A delay of the trigger (S/H) signal SHT2 is relatively short, and therefore, the reference voltage Vref2 is relatively low. In this case, the APC operation is performed according to the reference voltage Vref2, thereby the output power of the laser diode LD is adjusted to be a relatively low level, OP2.

The timing of the trigger (S/H) signal SHT3 is intermediate, and therefore, the reference voltage Vref3 is an intermediate value between the maximum and minimum voltages of the saw-tooth waveform. In this case, the output power of the laser diode LD is adjusted to be an intermediate level, OP3.

As described above, the reference voltage Vref can be adjusted to be a desired voltage by adjusting the delay time of the trigger (S/H) signal at an accuracy higher than the period of the clock signal CK. Therefore, a fine adjustment of the output power of the laser diode LD can be performed. It should be noted that it is not necessary to employ an expensive D/A converter in order to generate reference voltage.

In a case where the output power of the laser diode LD is required to be controlled according to an image to be printed and in a case where an individual difference of a sensitivity of the photoconductive drum is required to be adjusted, the APC operation described above can be applied. In addition, since the delay time of the clock can be finely adjusted, the fine adjustment of the reference voltage Vref is possible without employing a high frequency type clock generator. Accordingly, reduction of costs can be attained.

Since the reference voltage generating circuit 24 is provided with only the S/H circuit 26c and the saw-tooth wave generator 25c, downsizing, cost reduction, and simplification of the scanning optical unit 30 are achieved.

Downsizing and cost reduction of a tandem type laser beam printer having a plurality of scanning optical units can also be achieved. In addition, a cost of maintenance, which is performed by exchanging the scanning optical units, is also reduced.

A signal cable used to adjust the reference voltage Vref is one signal cable (trigger signal) among the four signal cables 41–44 connecting the scanning optical unit 100c (100m, 100y) and the control unit 30. Through the cable 42, the trigger signal is transmitted, which serves as a timing signal. Therefore, even if the cable is relatively long and a small noise is superimposed on the trigger signal (cable 42), the small noise exerts little effect on the sampling and holding timing of the saw-tooth wave.

Since the sampling and holding timing is not affected by the noise substantially, fluctuation in voltage of the Vref does not occur. Accordingly, fluctuation of the driving current supplied to the laser diode can be prevented, and fluctuation of the output power of the laser diode can be prevented. In particular, since the driving current does not change to an extremely large value, the laser diode is protected from being damaged.

It should be noted that the saw-tooth waveform increases from the minimum value to the maximum value as time elapses. Therefore, even if the BD pulse is not input to the saw-tooth wave generator 25c for some reason and the saw-tooth waveform is not reset to zero volt, the voltage of saw-tooth waveform is limited to the maximum value, and therefore, only the maximum voltage is held. Accordingly, even in the worst case, a reference voltage Vref sampled and held by sample-and-hold circuit 26c when trigger signal is output is limited to its maximum voltage. In this case, although a density of an image is relatively high, image can be formed.

If the saw-tooth wave generator 25c is configured such that the saw-tooth waveform decreases from the maximum value to the minimum value as time elapses, when the B/D pulse is not input, a voltage of saw-tooth waveform is lowered to the minimum voltage thereof. In such a case, in the worst case, the Vref has the minimum value. In this case, the laser diode hardly emits light, and therefore, an image may not be formed substantially. Therefore, it is preferable that the saw-tooth wave increases as time elapses.

The embodiment described above can be modified in various ways without departing the scope of the invention. For example, by making use of a signal having a relatively high frequency generated by the clock generator 33, it becomes possible to generate a desired trigger signal having desired delay time only by counting the clock signal CK using the counter. In this case, the delay circuit 37c and multiplexer 38c employed in the above embodiment can be omitted. This modification has advantages in that further simplification and downsizing can be attained.

The present disclosure relates to the subject matter contained in Japanese Patent Application No. HEI 11-331152, filed on Nov. 22, 1999, which is expressly incorporated herein by reference in its entirety.

What is claimed is:

1. A scanning optical device having an automatic power control circuit for controlling an output power of a laser diode, said automatic power control circuit comprising:
   a detector that detects an output power of said laser diode and outputs a detection value corresponding to the detected output power of said laser diode; and a reference value setter that outputs a reference value, said reference value setter including a saw-tooth wave generating circuit, a waveform of a first signal output by said saw-tooth wave generating circuit changing linearly in accordance with time and a sample-and-hold circuit that samples and holds said first signal, said scanning optical device comprising a trigger that transmits a trigger signal, said sample-and-hold circuit sampling and holding said first signal in response to said trigger signal, the sampled and held value of said first signal being output from said reference value setter as said reference value, a comparator that compares said detection value with said reference value, and outputs a signal representing a difference between said detection value and said reference value; and a driving current controller that controls a driving current flowing through said laser diode in accordance with said signal output by said comparator to vary the output power of said laser diode so that said detection value coincides with said reference value.

2. The scanning optical device according to claim 1, wherein said automatic power control circuit further comprises an APC controller that transmits an APC signal to said comparator at a predetermined timing, said comparator comparing said detection value with said reference value upon reception of said APC signal.

3. The scanning optical device according to claim 1, wherein said trigger determines a timing at which said trigger signal is output in accordance with at least one of a scanning speed, a sensitivity of a surface to be scanned and a resolution of an image to be formed.

4. The scanning optical device according to claim 1, wherein an amplitude of said signal output by said saw-tooth wave generating circuit increase in accordance with time.

5. The scanning optical device according to claim 4, wherein the laser beam emitted by said laser diode is periodically scanned at a predetermined cycle, said saw-tooth wave generating circuit generating the signal having a saw-tooth shaped waveform synchronously with the periodical scanning of said laser beam.

6. The scanning optical device according to claim 5, wherein the amplitude of the signal output by said saw-tooth wave generating circuit increases from its minimum value at every scanning of said laser beam.

7. The scanning optical device according to claim 6, wherein the amplitude of said signal output by said saw-tooth wave generating circuit varies between the minimum value and a predetermined maximum value.

8. The scanning optical device according to claim 1, further comprising a scanning optical unit that deflects the laser beam emitted by said laser diode to scan on a surface to be scanned, said scanning optical unit being integral with said automatic power control circuit, said trigger being distinct from said scanning optical unit, said trigger and said scanning optical unit being connected with at least a cable for transmitting said triggering signal.

9. The scanning optical device according to claim 8, wherein the laser beam emitted by said laser diode periodically scans at a predetermined cycle, said saw-tooth wave generating circuit generating the signal having the saw-tooth shaped waveform synchronously with the periodical scanning of said laser beam.

10. The scanning optical device according to claim 8, wherein said scanning optical unit includes a synchronizing signal generator that generates a synchronizing signal which is output synchronously with every scanning of said laser beam, said saw-tooth wave generating circuit being reset in response to said synchronizing signal, said trigger determining the timing at which said triggering signal is output in accordance with image data of an image to be formed.

11. The scanning optical device according to claim 10, said trigger comprising:

a clock generator that generates a clock signal including clock pulses output at a predetermined frequency;

a counter that counts the number of the clock pulses included in the clock signal; and a number setter that sets a number to be counted by said counter, said triggering signal being output when said counter has counted the number set by said number setter.

12. The scanning optical device according to claim 11, wherein said number setter determines the number set to said counter based on the image data.

13. The scanning optical device according to claim 10, said trigger comprising:

a clock generator that generates a clock signal including clock pulses output at a predetermined frequency;

a counter that counts the number of the clock pulses included in the clock signal;

a number setter that sets a number to be counted by said counter, said counter outputting a count-up signal when the counter number of the clock pulses reaches said number to be counted; and a delay unit that delays said count-up signal by one of a plurality of durations of time, each of said plurality of durations of time being shorter than a period of said clock pulses, the delayed count-up signal being output as said triggering signal.

14. A scanning optical device having an automatic power control circuit for controlling an output power of a laser diode, comprising:

a detector that detects an output power of said laser diode and outputs a value corresponding to the output power of said laser diode;

a saw-tooth wave generator that outputs a saw-tooth wave which varies in accordance with time;

a trigger that outputs a trigger signal; and a sample-and-hold that samples and holds the saw-tooth wave in response to the trigger signal, wherein an automatic power control operation is performed based on said sampled and held value and the value corresponding to the output power of the laser diode.

* * * * *